United States Patent [19]
Hinkston et al.

[11] Patent Number: 5,785,333
[45] Date of Patent: Jul. 28, 1998

[54] COLLAPSIBLE BICYCLE TRAILER FOR A TODDLER

[76] Inventors: Paul Hinkston, 6 Flintlock La., Bell Canyon, Calif. 91307; Richard C. Everett, 225 Sunshine La., West Linn, Oreg. 97068

[21] Appl. No.: 380,004

[22] Filed: Jan. 27, 1995

[51] Int. Cl.$^6$ ...................................................... B62B 3/02
[52] U.S. Cl. .......................... 280/204; 280/647; 280/656; 296/77.1
[58] Field of Search ........................... 280/204, 202, 280/292, 32.7, 47.25, 47.2, 652, 647, 648, 644, 650, 30, 1.5, 656; 296/77.1, 36

[56] References Cited

U.S. PATENT DOCUMENTS

| | | | |
|---|---|---|---|
| 4,695,072 | 9/1987 | Brooks | 280/47.25 |
| 4,756,541 | 7/1988 | Albrite | 280/204 |
| 5,020,814 | 6/1991 | George | 280/204 |
| 5,265,891 | 11/1993 | Diehl | 280/1.5 |
| 5,308,096 | 5/1994 | Smith | 280/30 |
| 5,454,577 | 10/1995 | Bell | 280/656 |
| 5,460,395 | 10/1995 | Chen | 280/204 |
| 5,474,316 | 12/1995 | Britton | 280/656 |

Primary Examiner—Anne Marie Boehler
Attorney, Agent, or Firm—Edward E. Roberts

[57] ABSTRACT

A lightweight two-wheeled trailer with demountable bicycle type wheels, a removable flexible cloth-like seat, removable upper and lower flexible (and at least partially light-transmitting) weather covering, a removable tow arm and a collapsible frame assembly. The frame assembly includes a structural tubular frame supporting removable wheels with the axles canted so that the wheels are downwardly divergent relative to the ground. The frame assembly includes generally U-shaped support with first and second upright articulated rear tube assemblies coupled intermediate the support and the frame, the tubular members of the frame assembly being configured and dimensioned to define a seating area for one or more infants or toddlers. A depending generally U-shaped tubular ground brace is affixed to the front bar of the support frame, to serve both as ground support (when needed), as well as to define a foot well area for the occupants. The tow bar member interconnects, at one end, with the front bar and a side rail of the support frame, with the other end having a clamp device for attachment to a rigid portion of the bicycle. A flexible cloth-like seat is provided along with a trough-shaped foot well and side curtain assembly and a canopy for providing a weather proof enclosure for the occupant.

10 Claims, 18 Drawing Sheets

COLLAPSIBLE BICYCLE TRAILER FOR A TODDLER

BACKGROUND OF THE INVENTION

The background of the invention will be discussed in two parts.

1. Field of the Invention

This invention relates to baby carriages, and more particularly to a bicycle towed trailer assembly for portage of one or more infants or toddlers, which trailer is lightweight and includes a flexible weather protective enclosures for the infant or toddler.

2. Description of the Prior Art

Infant or toddler carriers for use with bicycles have taken many form. In some such devices, attachment is made to the crossbar between the rider and the handlebars. Other such devices are seating devices attachable to the bicycle to the rear of the rider, that is above the rear wheel. In more recent times, such infant or toddler carrying vehicles have taken the form of two wheel trailers configured for towing behind the bicycle, which are conventionally configured with a seating area for the infant or toddler. There are many varieties of such devices.

In accordance with an aspect of the invention, there is provided a collapsible towable infant or toddler trailer assembly with removable wheels, a removable weather proof cloth-like enclosure package, and a collapsible frame which may be readily assembled and disassembled, which trailer is compact, stable and lightweight.

SUMMARY OF THE INVENTION

In accordance with the invention there is provided a lightweight two-wheeled trailer with demountable or removable wheels, a removable flexible cloth-like seat, removable upper and lower flexible (and at least partially light-transmitting) weather covering, a removable tow arm and a collapsible frame assembly. The frame assembly includes a primary structural tubular frame assembly having first and second aligned axle stubs with readily removable couplers provided for supporting demountable or removable large diameter spoked wheel pneumatic tires with the axles thereof canted so that the wheels are downwardly divergent relative to the ground. The frame assembly includes an open generally rectangular enclosure framework of tubular metal material with a support formed of first and second arcuate side tubes with an interconnecting cross-bar hingedly coupled to a front bar of the support frame.

First and second upright articulated rear tube assemblies are coupled intermediate the support and the cross-bar, the tubular members of the enclosure support assembly being configured and dimensioned to define a seating area for one or more infants or toddlers. A depending generally U-shaped tubular ground brace is affixed to the front bar of the support frame, to serve both as ground support (when needed), as well as to define a foot well area for the occupants. The tow bar member interconnects, at one end, with the front bar and a side rail of the support frame, with the other end having a clamp device for attachment to a rigid portion of the bicycle.

The first and second upper articulated rear tube assemblies each include first and second tubes hingedly interconnected by means of interconnectors with a saddle-shaped main body portion having a width between opposing sidewalls a dimension slightly greater than the diameter of the tubes. Each interconnector has one of the tubes fixedly coupled within the saddle thereof, with the other of the tubes being pivotally coupled to the interconnector adjacent an end within the saddle, the sidewalls having aligned apertures therethrough dimensioned for receiving a suitable fastener, such as a releasable coupling pin with a spring loaded ball bearing a at the end thereof for enabling captive, yet releasable retention of the two tubes of each tube assembly in generally aligned relation.

A flexible canvas or cloth-like seat is provided with a detachable fasteners for attachment to the cross-bar and the front bar of the support frame. A trough-shaped foot well and side curtain assembly is configured of flexible weather treated canvas or cloth-like material for attachment around the ground brace and the underside of the support frame, with hingedly coupled side curtains affixed, such as by sewing, to lateral edges of the foot well, the side curtains being configured to the dimensions of the side of the frame assembly. A canopy of flexible weather treated canvas or cloth-like material is provided, and is configured, dimensioned and arranged for covering the frame assembly from front to rear, the canopy being contoured to provide depending lip portions outside the side curtains. The forward portion of the canopy is provided with a mesh or net covered opening for ventilation, with a foldable or flexible clear plastic window portion.

Other objects, features and advantages of the invention will become apparent from a reading of the specification, when taken in conjunction with the drawings, in which like reference numerals refer to like elements in the several views.

DESCRIPTION OF THE PREFERRED EMBODIMENT

Figure 1:
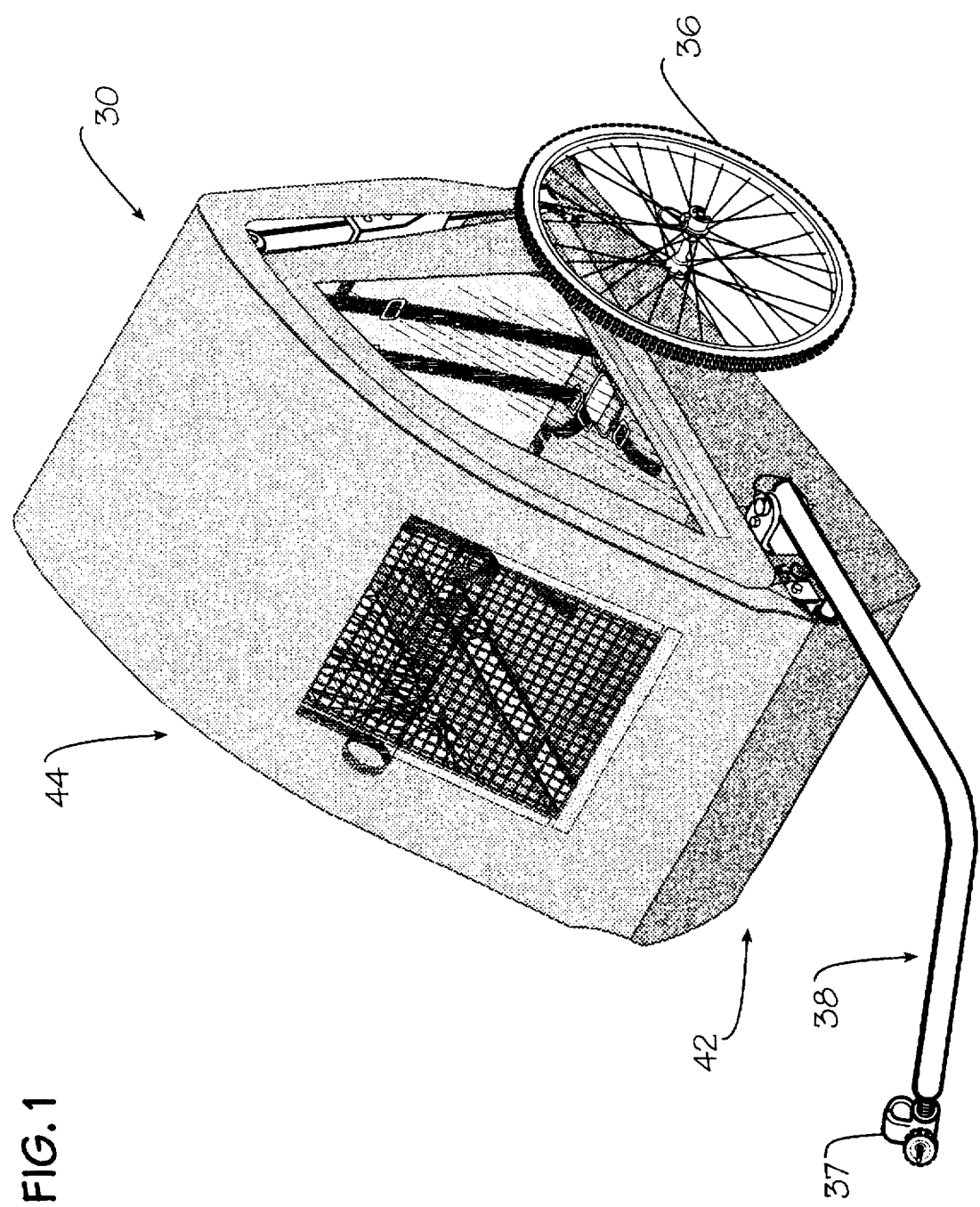
FIG. 1 is a perspective view of the collapsible toddler trailer according to the invention.
Figure 2:
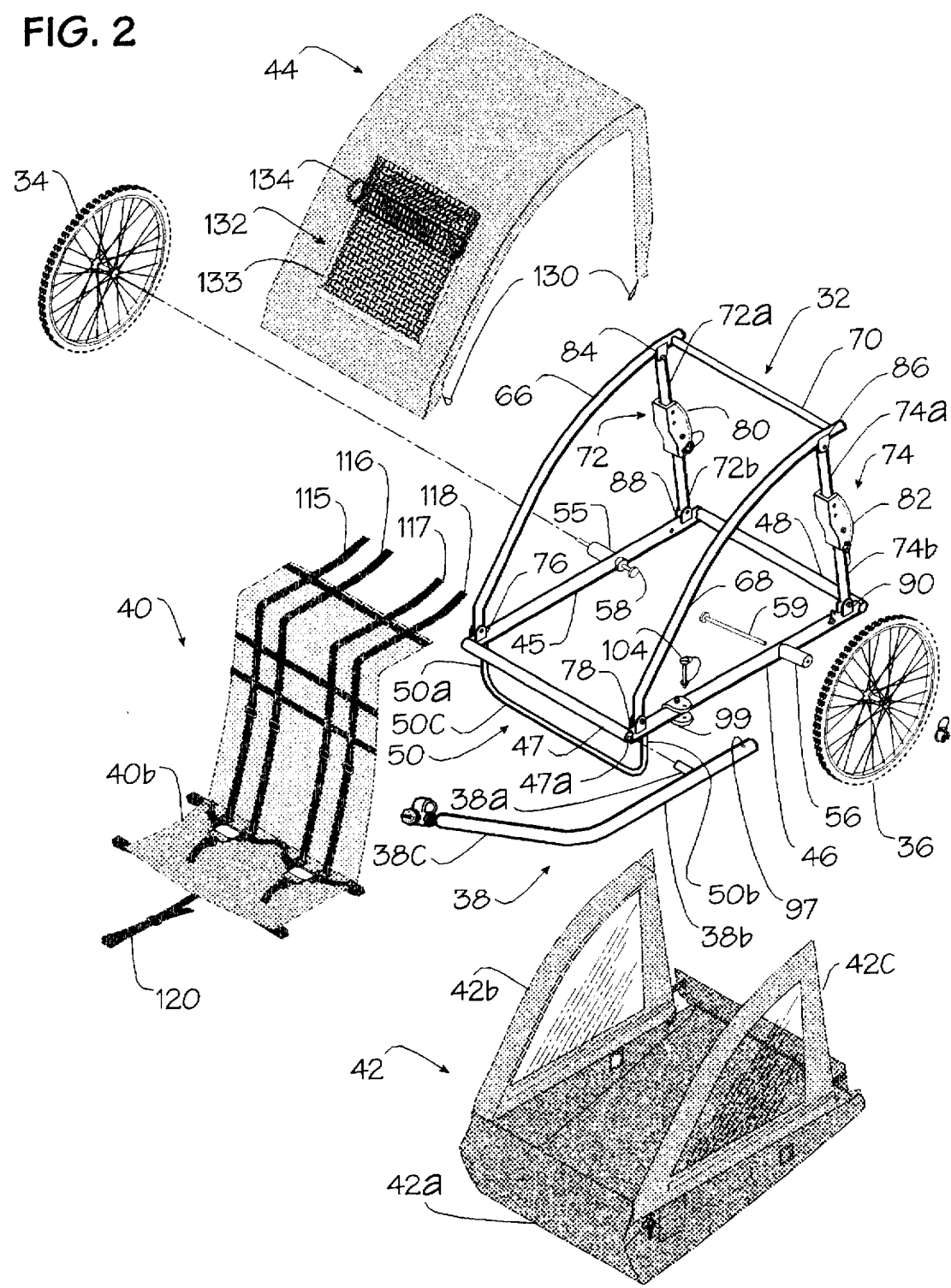
FIG. 2 is an exploded perspective new of the collapsible toddler of FIG. 1.

Referring now to the drawings, and particularly to FIG. 1 and 2, there is shown a two wheeled collapsible toddler trailer, generally designated 30, according to the invention and includes a tubular structure assembly, generally designated 32, demountable pneumatic tire bicycle type spoked wheels 34, 36, a tow arm 38, a flexible cloth-like seat 40, a foot well and side curtain assembly, generally designated 42 and a canopy, generally designated 44. As will be described, the trailer 30 is configured to provide a weather protective transport for an infant or toddler, although it could conveniently be employed for transport of a pet as an occupant if so desired, and is intended for towing behind human-powered vehicle, such as a bicycle. The framing structure assembly 32 is configured of generally rigid lightweight tubular material, such as aluminum, and forms a cage dimensioned for generally surrounding and receiving therein one or two occupants, such as infants or toddlers. The weather-resistant enclosure, as will be described, is formed of a flexible canvas or cloth-like material, netting and flexible transparent portions, with fastening means attached to the parts for ready assembly to, and disassembly from, the framing structure 32.

Referring also to FIGS. 3 through 12, briefly, the framing structure 32 includes an open generally rectangular framework of tubular metal material, such as aluminum, with a hingedly coupled support frame formed of first and second arcuate side tubes with an interconnecting cross-bar, and first and second upright articulated rear tube assemblies coupled intermediate the framework and the cross-bar of the support frame, the tubular members being configured and dimensioned the define a seating enclosure for one or more infants or toddlers.

The framing structure 32 has a generally rectangular rigid primary structural frame formed of side rail 45, 46, a front bar 47 and a rear bar 48. The rails 45 and 46 are disposed in parallel relation with rear bar 48 secured at the ends thereto to the rear ends of rails 45, 46. The front bar 47 is likewise secured at opposite ends to the front ends of rails 45, 46, in generally parallel relation to rear bar 48 however, as shown in FIG. 2, one end 47a of tubular front bar 47 is open for enabling reception of a connecting stub 38a of the tow arm 38. A generally U-shaped tubular ground brace 50 is fixedly secured at the ends of the legs 50a, 50b to front ends of side rails 45 and 46 respectively in depending relation thereto, with the bight portion 50c being straight and in generally parallel relation to the front bar 47. As will be described, this ground brace 50 serves to support the trailer prior to attachment and also serves to define a foot well compartment for an occupant.

Each of the side tubes 45, 46 have an axle-receiving stub member 55, 56 secured thereto, the first and second axles tube members 55, 56 being aligned relative to one another in a direction generally perpendicular to side tubes 45, 46 and inclined upwardly relative to the plane of the rectangular primary structural tubular frame. The stub members 55, 56 are formed of more substantial material, such as rod material with an axial aperture drilled therethrough to form bearing journals. Passing therethrough are first and second headed axle members 58, 59 respectively, which extend from the interiors thereof outwardly to pass through the hubs of wheels 34, 36, respectively, and protrude beyond the ends thereof for receiving couplers 60, 61 (See FIGS. 8–10) for fixedly, and releasable, attaching the wheels 34, 36, to the axles 58,59, respectively. The stub members 55, 56 are canted to receive the demountable or removable large diameter spoked wheel pneumatic tires with the axles thereof canted to that the wheels are downwardly divergent relative to the ground.

A hingedly coupled enclosure support frame is provided, including a main support, which is formed of first and second arcuate side tubes 66, 68 with an interconnecting cross-bar 70. First and second upright articulated rear tube assemblies, generally designated 72, 74, are coupled intermediate the primary structural frame and the side tubes 66, 68, adjacent the crossbar 70 of the support for enabling retention of the support in one of two positions, a first position (See FIGS. 11 and 12) with the enclosure support overlying the primary structural frame, and a second open position (See FIG. 3). The support, formed of side tubes 66, 68 and cross bar 70, is formed in a generally U-shaped configuration with the front ends of the side tubes 66, 68 being inserted into devises 76, 78, which are secured to the front ends of side rails 45, 46, respectively, in an upward opening orientation. Suitable pins are fixedly inserted through aligned apertures in the side tube 66 and 68, and its associated clevis 76 and 78, for providing a hinged connection.

The articulated rear tube assemblies 72, 74 are generally identical and includes first and second upper tubes 72a, 74a and lower tubes 72b, 74b, and interconnections 80, 82. One end of each upper tube 72a, 74a is pivotally connected within a clevis 84, 86, respectively, each of which is attached adjacent the upper end of the corresponding arcuate side tubes 66, 68, respectively, with the opening of the clevis in a downward orientation. One end of each lower tube is similarly pivotally connected within a clevis 88, 90, respectively, each of which is attached adjacent the rear end of the corresponding side rail, 45, 56, respectively, with the opening of the clevis in a upward orientation. The other ends of the upper and lower tubes are hingedly interconnected by means of the interconnectors 80, 82, respectively, each of which is identical and has a saddle-shaped main body portion of a width between opposing sidewalls a dimension slightly greater than the diameter of the tubes.

Figure 3:
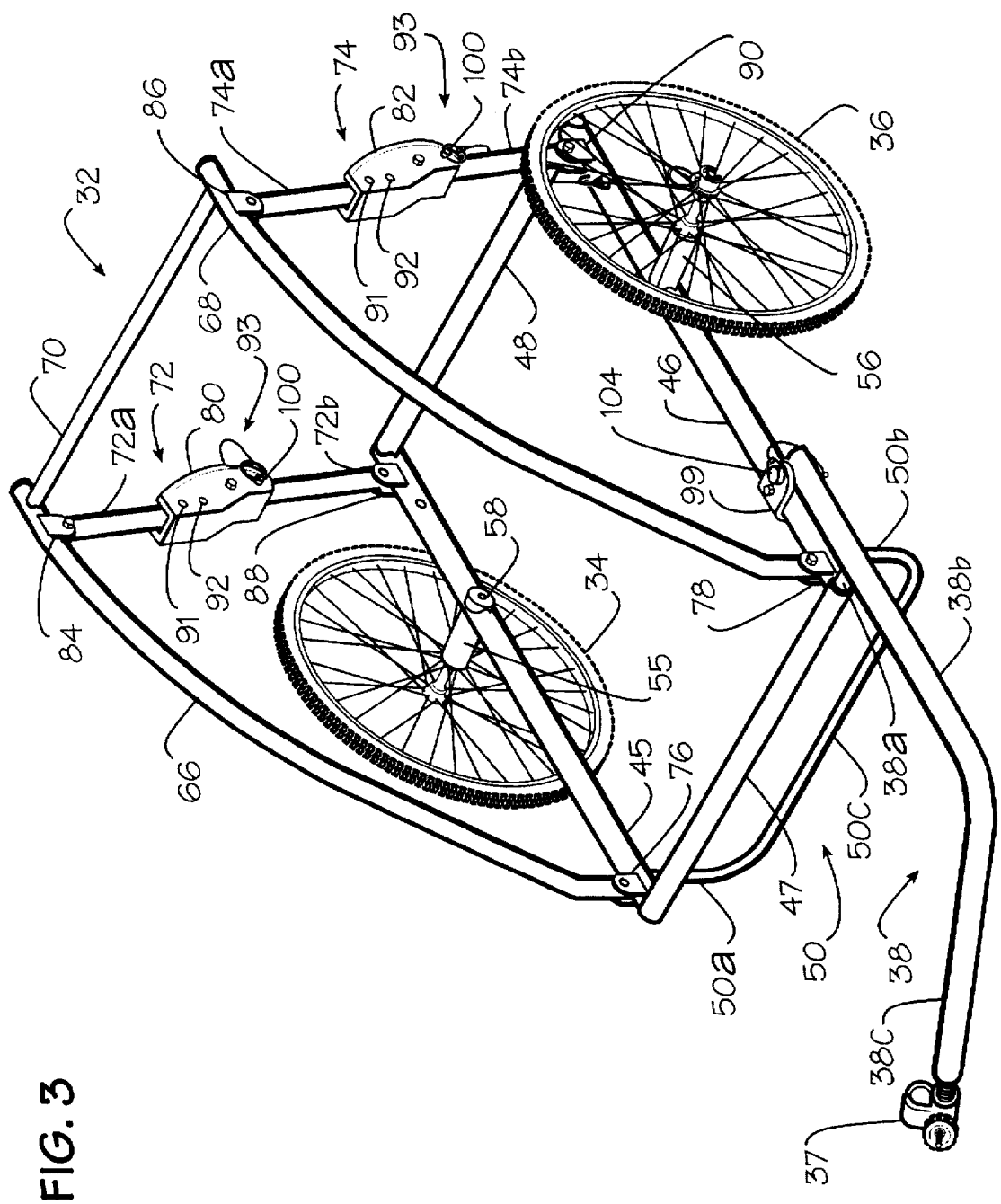
FIG. 3 is a perspective view of the tubular framing structure of collapsible toddler trailer of FIG. 1.
Figure 4:
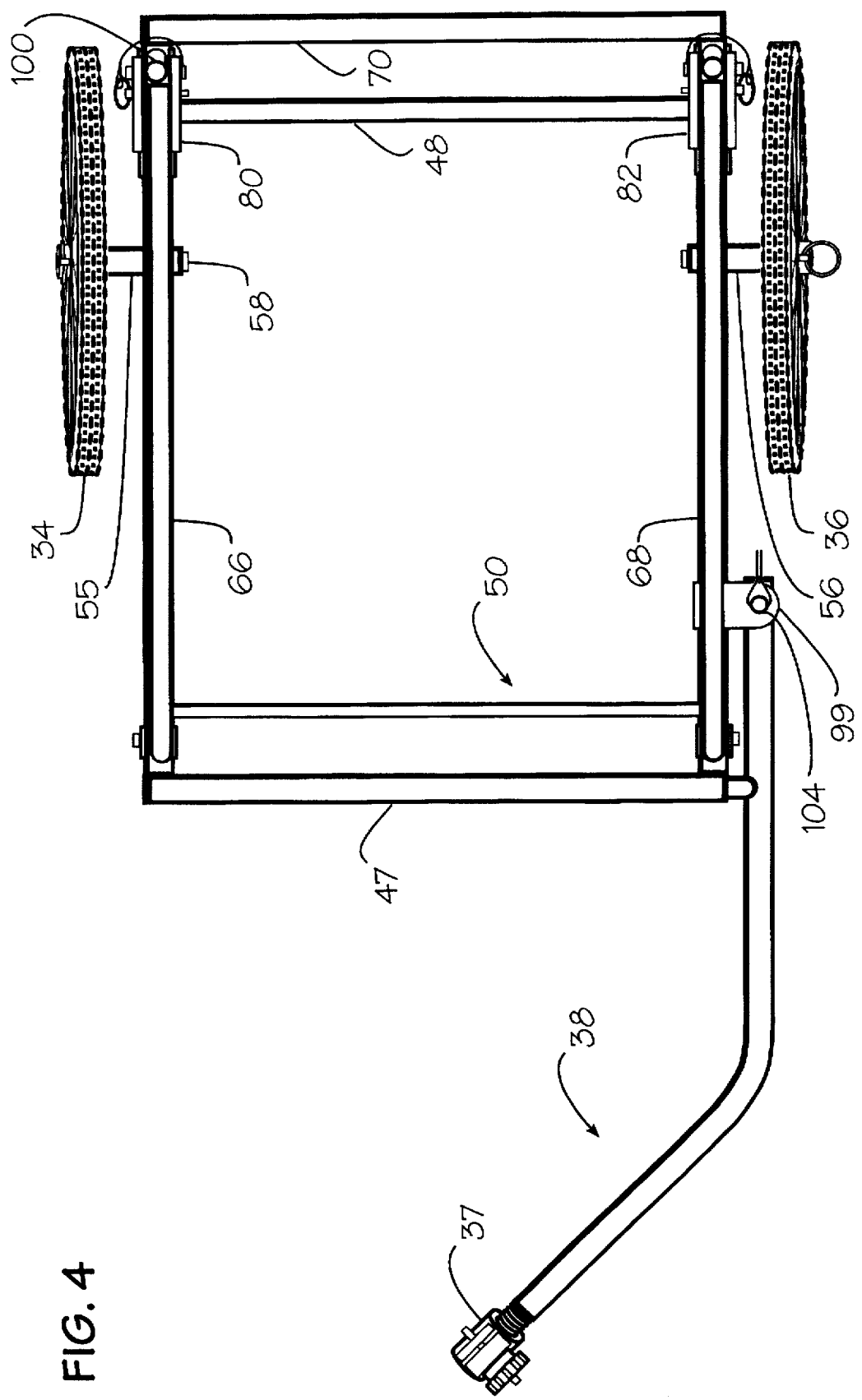
FIG. 4 is a top plan view of the collapsible toddler framing structure of FIG. 3.
Figure 5:
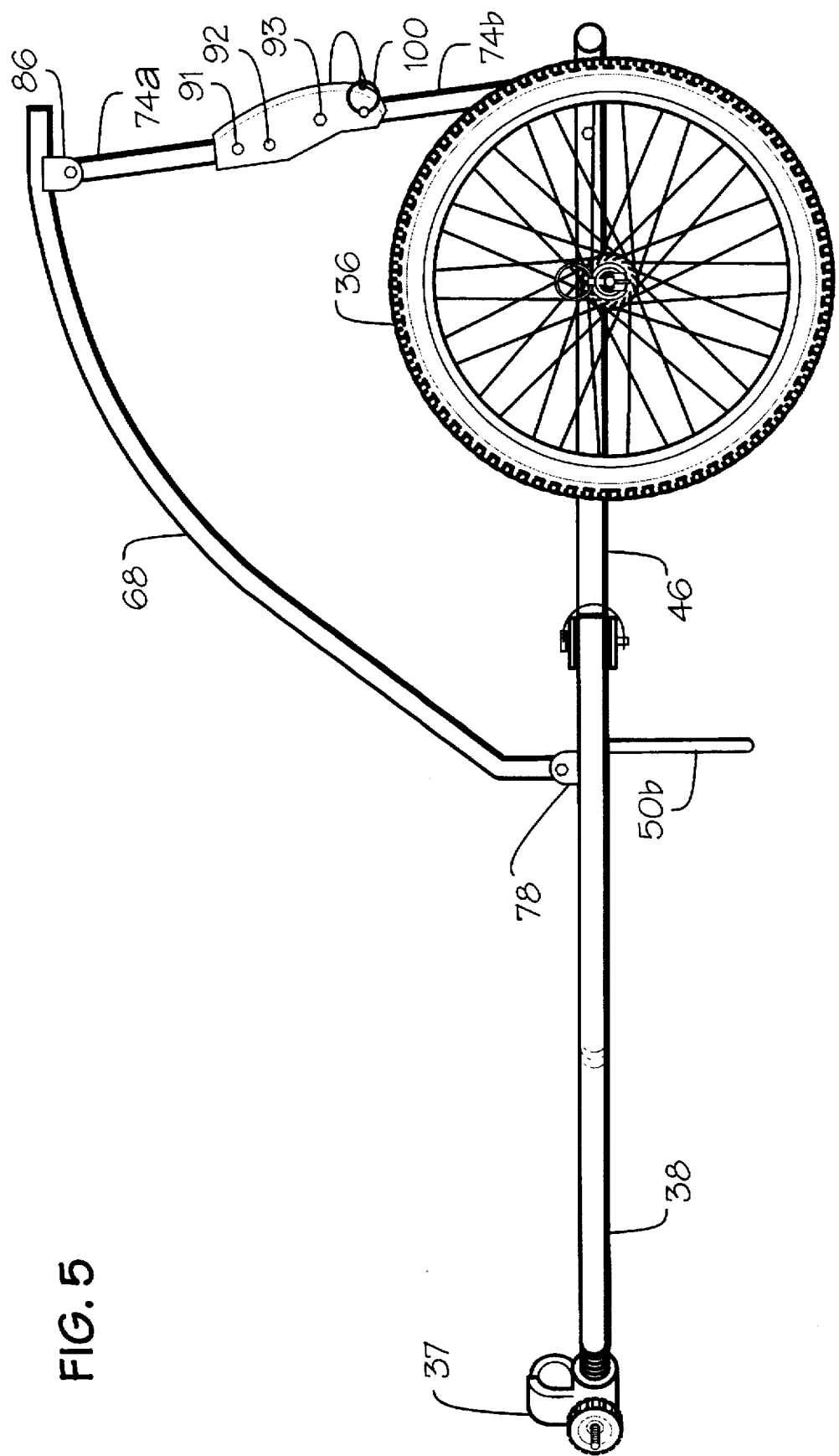
FIG. 5 is a side elevational view of the collapsible toddler trailer framing structure of FIG. 3.
Figure 6:
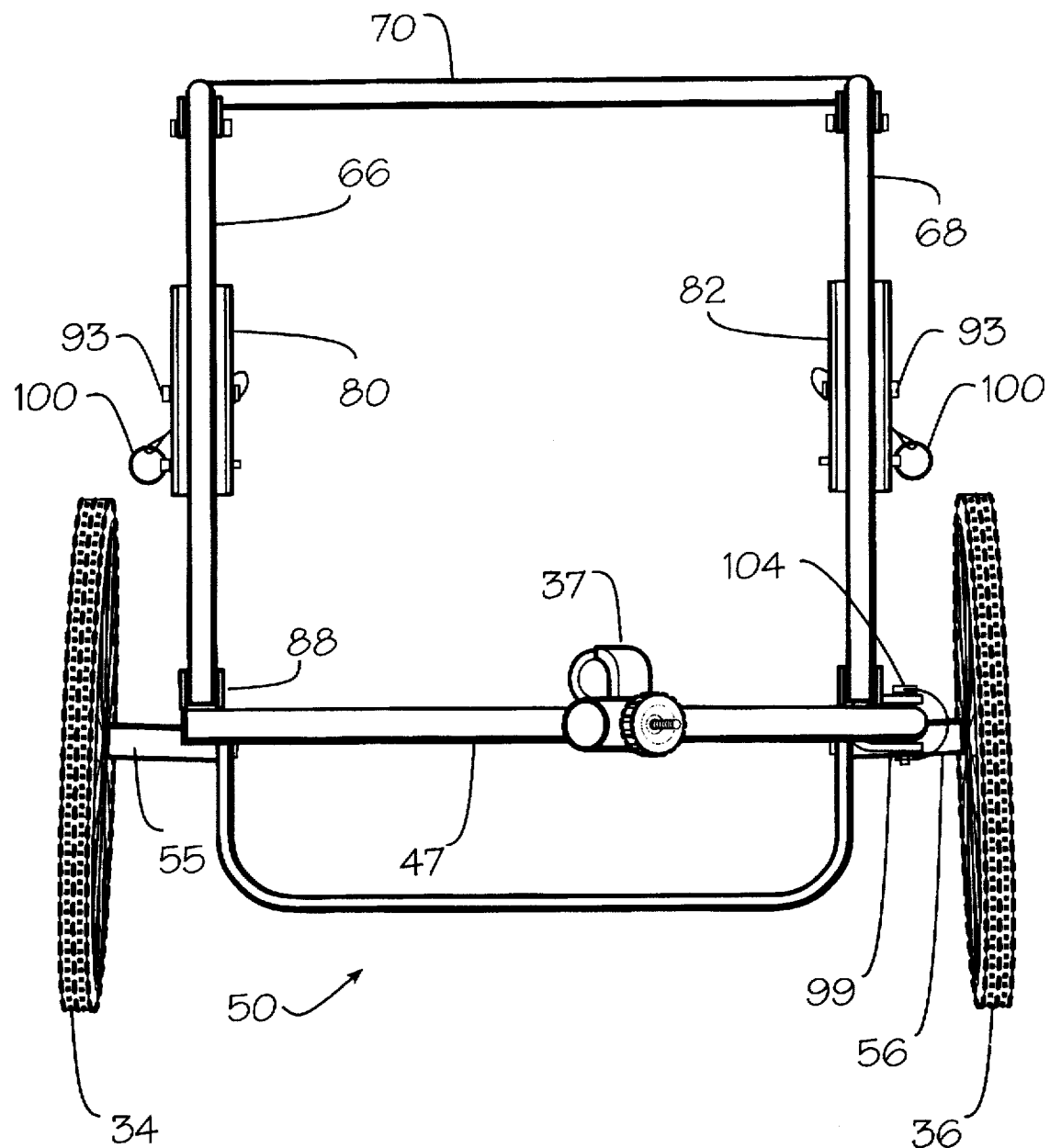
FIG. 6 is a front elevational view of the collapsible toddler trailer structure of FIG. 3.
Figure 7:
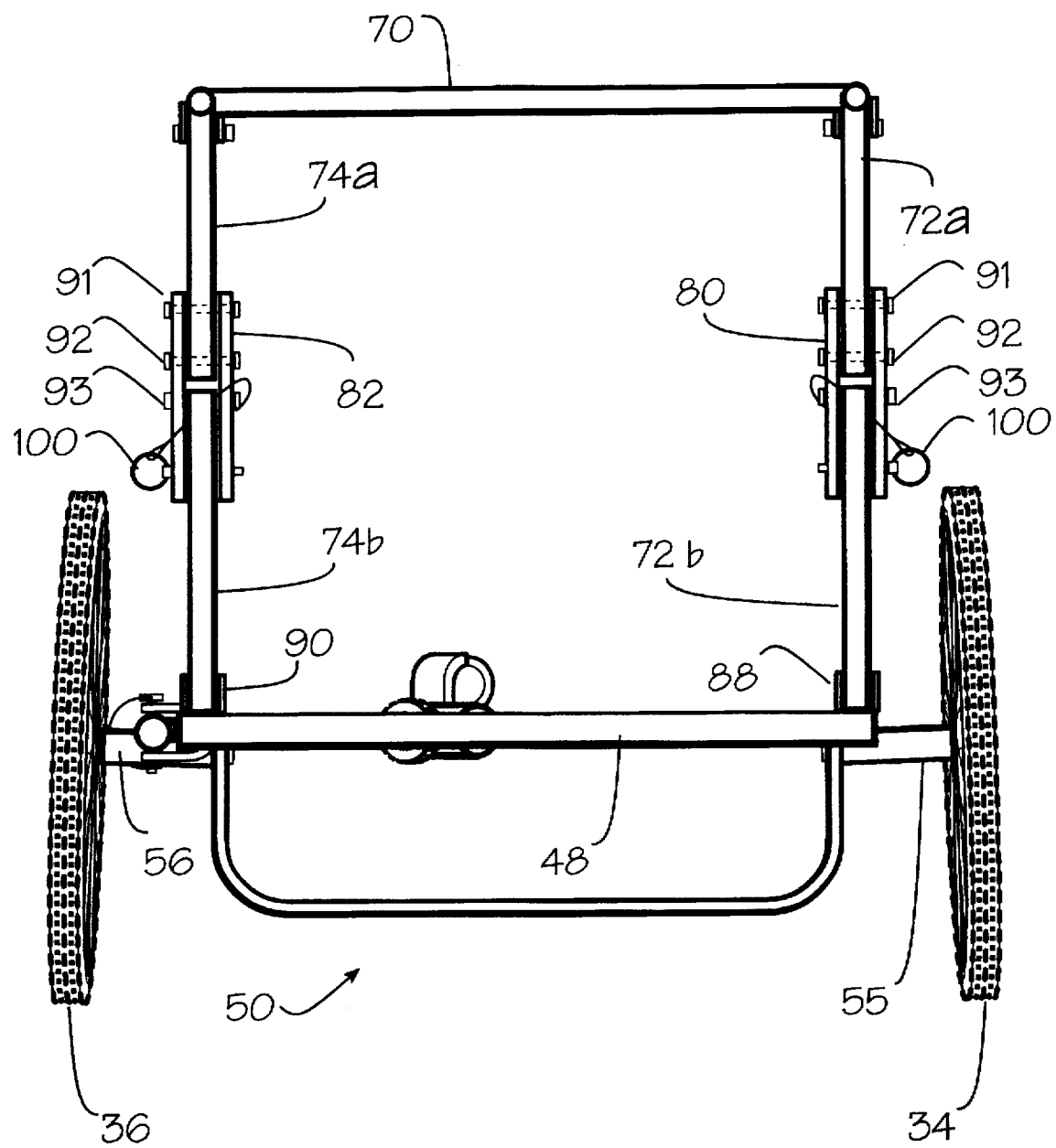
FIG. 7 is rear elevational view of the collapsible toddler trailer framing structure of FIG. 3.
Figure 11:
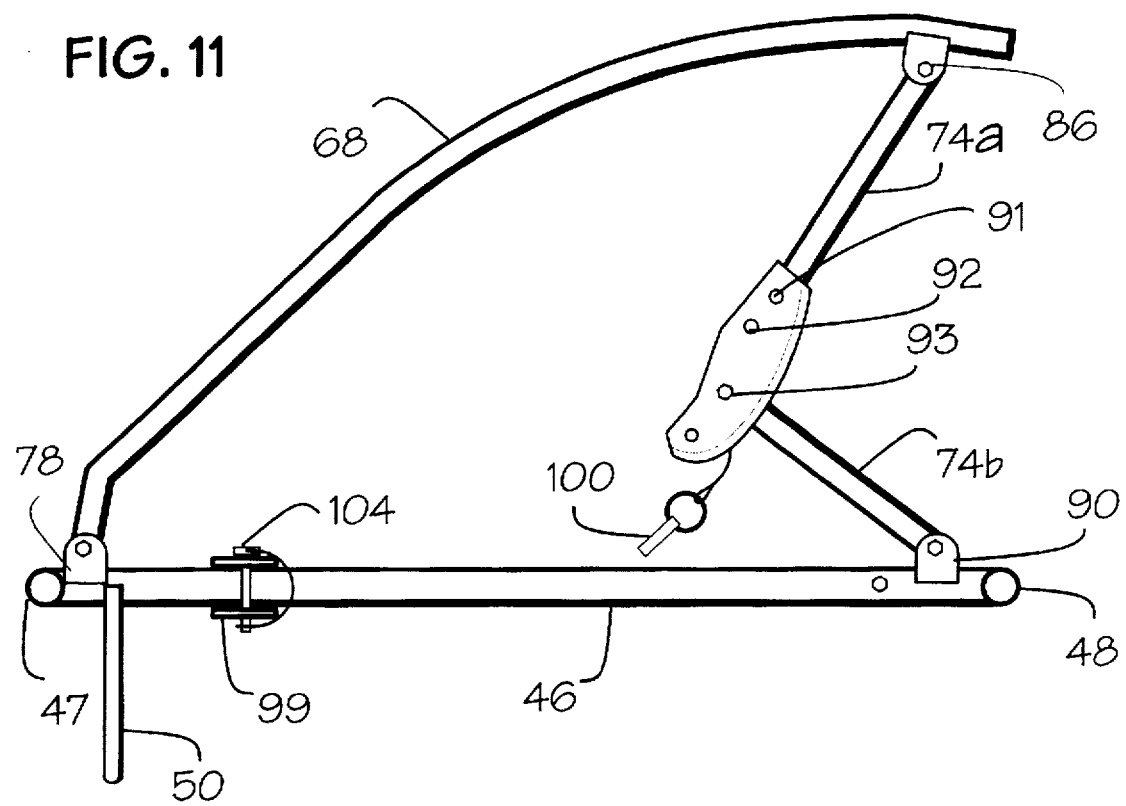
FIG. 11 and 12 are side elevational views of the collapsible toddler trailer framing structure of FIG. 3, with the wheels removed in intermediate stages of collapsing for storage or transport.
Figure 12:
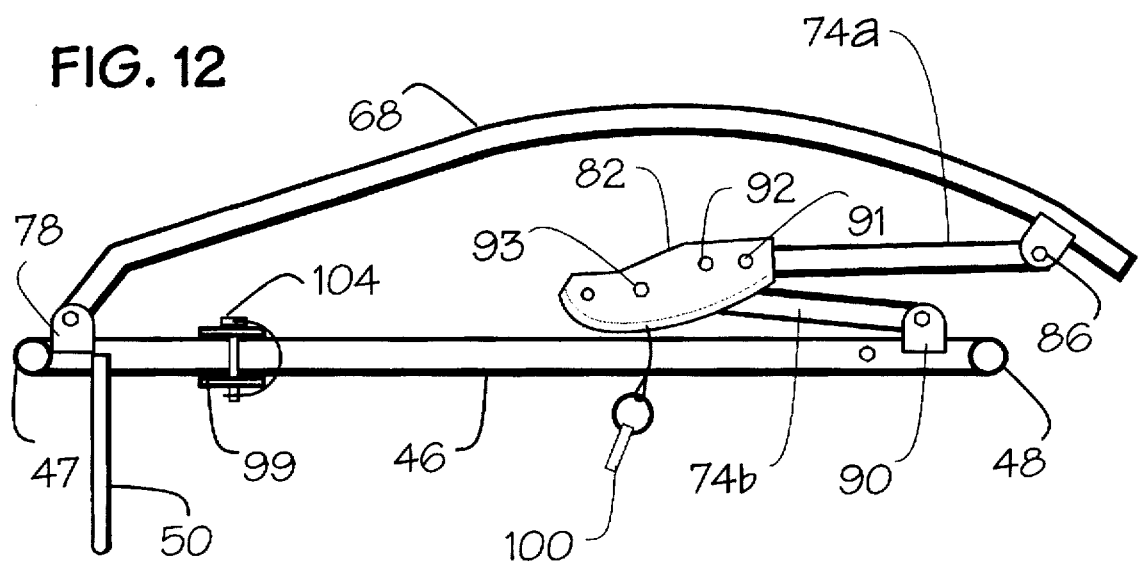

Referring to FIGS. 3, 7, 11 and 12, each interconnector 80, 82, has one end of the upper tubes 72a, 74a, respectively fixedly coupled within the saddle thereof by suitable fasteners, such as a pair of spaced rivets 91, 92. One end of the lower tubes 72b, 74b, is pivotally coupled to the interconnector adjacent an end within the saddle by means of a rivet 93 passing through aligned apertures in the saddle and tubes. The thus-pivoted ends of tubes 72b, 74b, each have an aperture therethrough for alignment with a pair of aligned apertures in the sidewalls of the saddle portion of interconnectors 80 and 82, the thus-aligned apertures being dimensioned for receiving a suitable fasteners, such as a releasable coupling pin 100, with a spring loaded ball bearing at the end thereof for enabling captive, yet releasable retention of the two tubes of each tube assembly in generally aligned relation (as shown in FIG. 3), while enabling folding to an overlying position (as shown in FIGS. 11 and 12) on removal of the coupling pin 100.

Referring again to FIGS. 1 through 3, the tow arm 38 may be formed of tubular material or solid bar stock in either event, provision in made at one end for threads for threadably receiving a clamp 37. The tow arm 38 is formed from a length of stock which is bent to form an obtuse angle with a rear or main portion 38b and a front portion 38c, the end of which has the threads for the clamp 37. The main body portion 38b is provided with an aperture 97 in the end thereof, and also has affixed thereto the connecting stub 38a, which is a smaller diameter short rod 98 generally perpendicular to the axis of the main portion 38b. The stub 38a has a diameter slightly smaller than the inner diameter of the front bar 47 of the primary structural frame. A generally U-shaped holder 99 is attached to the side rail 46 with the open end thereof extending outwardly. The spacing of the holder 99 is a dimension slightly greater then the diameter of the tow arm 38. The holder 99 is spaced along the rail 46 at such a position relative to the spacing between the connecting stub 38a and the aperture 97 so that the rod 38a may be inserted into the opening 47a of front bar 47 with the aperture 97 in between the ends of the holder 99. The ends of holder 99 have apertures therethrough in alignment with the aperture 97 for receiving a suitable fastener, such as a releasable coupling pin 104, with a spring loaded ball bearing at the end thereof for enabling captive, yet releasable retention of the tow arm 38.

Figure 8:
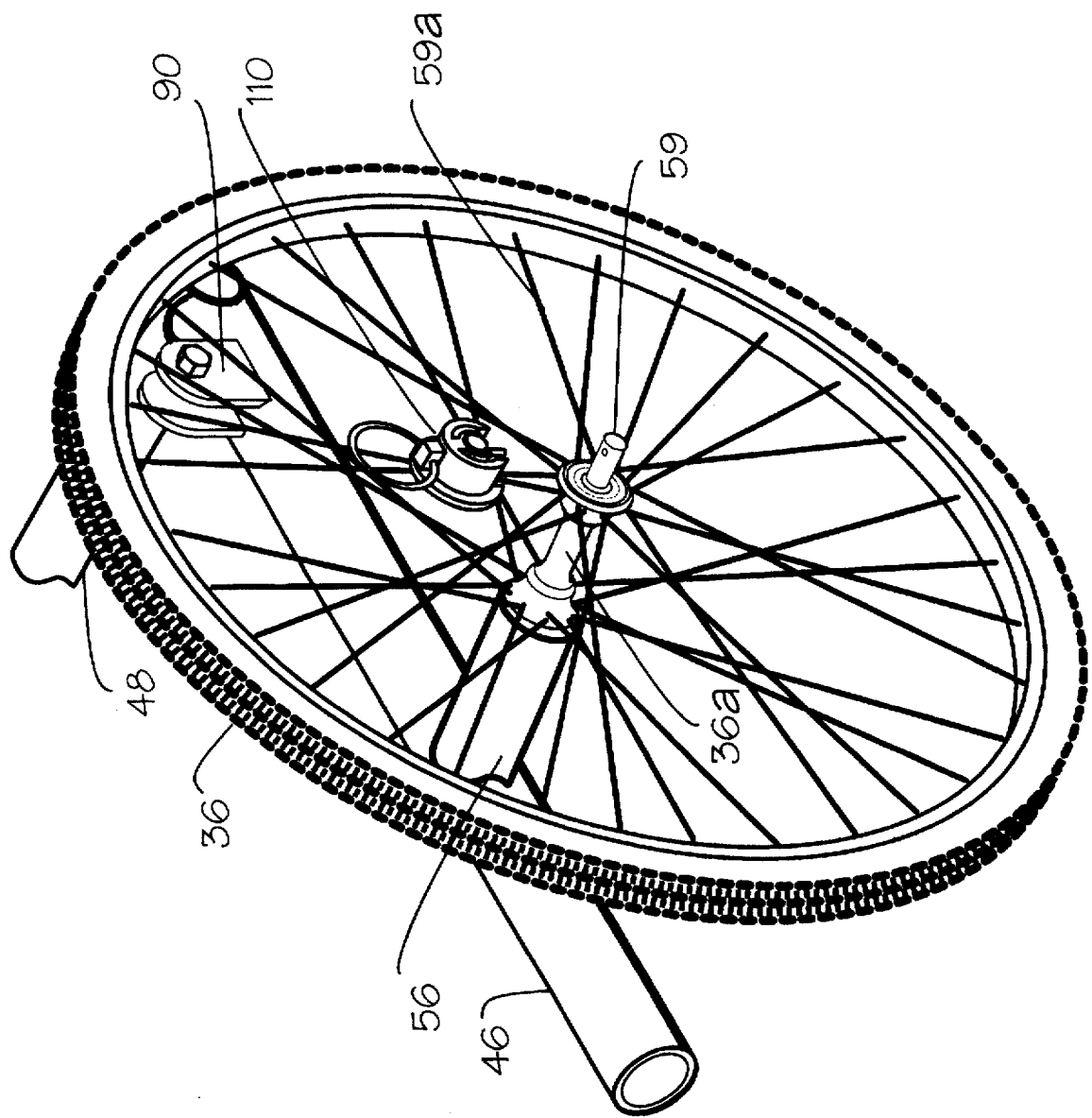
FIG. 8 through 10 are enlarged fragmentary perspective views of one pneumatic wheel interconnection showing the stages of attachment of the fastener to the axle for removably retaining the wheel thereon.
Figure 10:
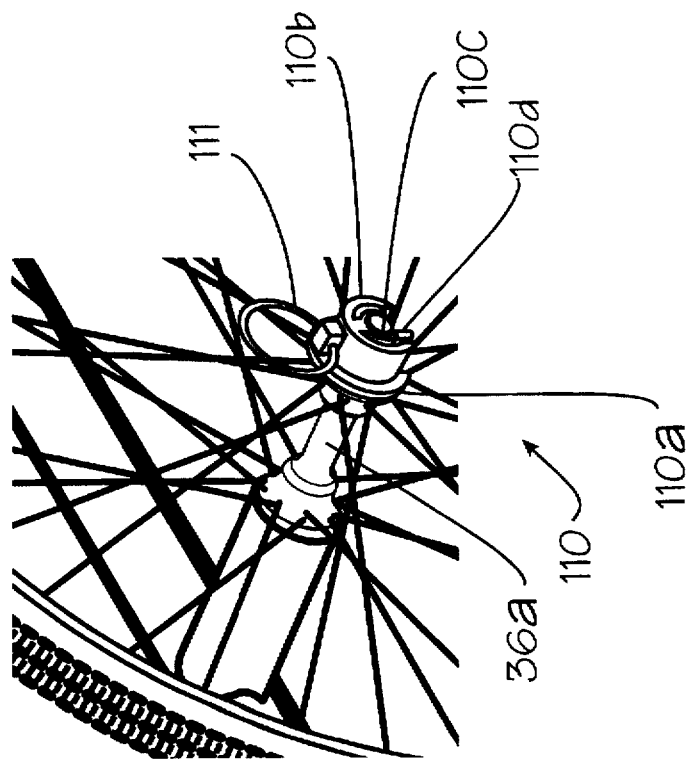
Figure 9:
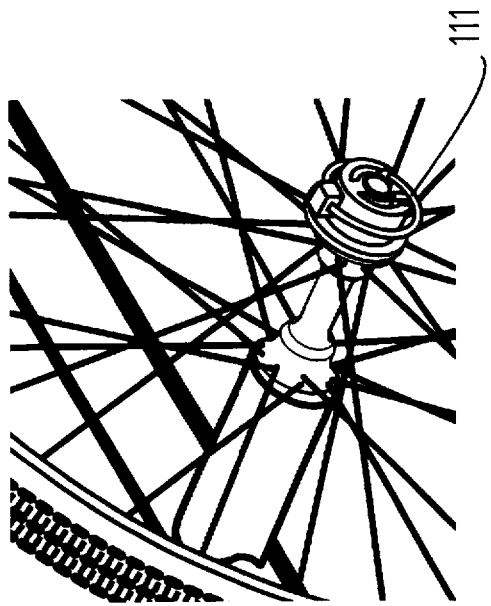

FIGS. 8 through 10 depict the attachment of the pneumatic wheel 36 to the stub member 56 and axle 59. The axle 59 is a headed axle member which is inserted through the axial bore of the stub member 56, and protrudes outwardly beyond the end of stub member 56 a distance greater than the hub 36a of the wheel 36. An aperture 59a extends through the distal end of the axle 59. A coupler 110 is provided, the coupler 110 having a generally cylindrical configuration with a bearing flange 110a for positioning against the hub 36a. The drum-shaped body 110b is provided with a radially extending slotted opening slotted opening 10c, the width of which is slightly greater then the diameter of the axle 59. Within the opening 110c there is a radially extending pin 110d having a diameter slightly less than the diameter of the aperture 59a through axle 59. The coupler 110 is moved radially relative to the axle 59 until the pin 110d passes through the aperture 59a. A spring coil or ring 111 is pivotally coupled to the body 110b and, after positioning of the coupler, the ring 111 is pivoted from the position shown in FIG. 9 to that shown in FIG. 10. The diameter of the ring 111 is about the same as the diameter of the body 110b so that some pressure is required to move the ring 111 into the position of FIG. 11, thereby creating frictional engagement.

FIGS. 11 and 12 show the frame structure in two positions during collapse. The wheel and tow arm have been removed. As shown, the removable pins 100 and 104 are attached to the interconnectors 82 (and 80) and holder 99 by means of a wire and ring arrangement to prevent loss. In FIG. 12, the structure is shown in its fully collapsed position, and the lower tube member 74b is in generally overlying relation with the side rail 46. Although the ground brace 50, in the preferred embodiment is fixedly attached, it can also be configured for removal, if desired.

Figure 13:
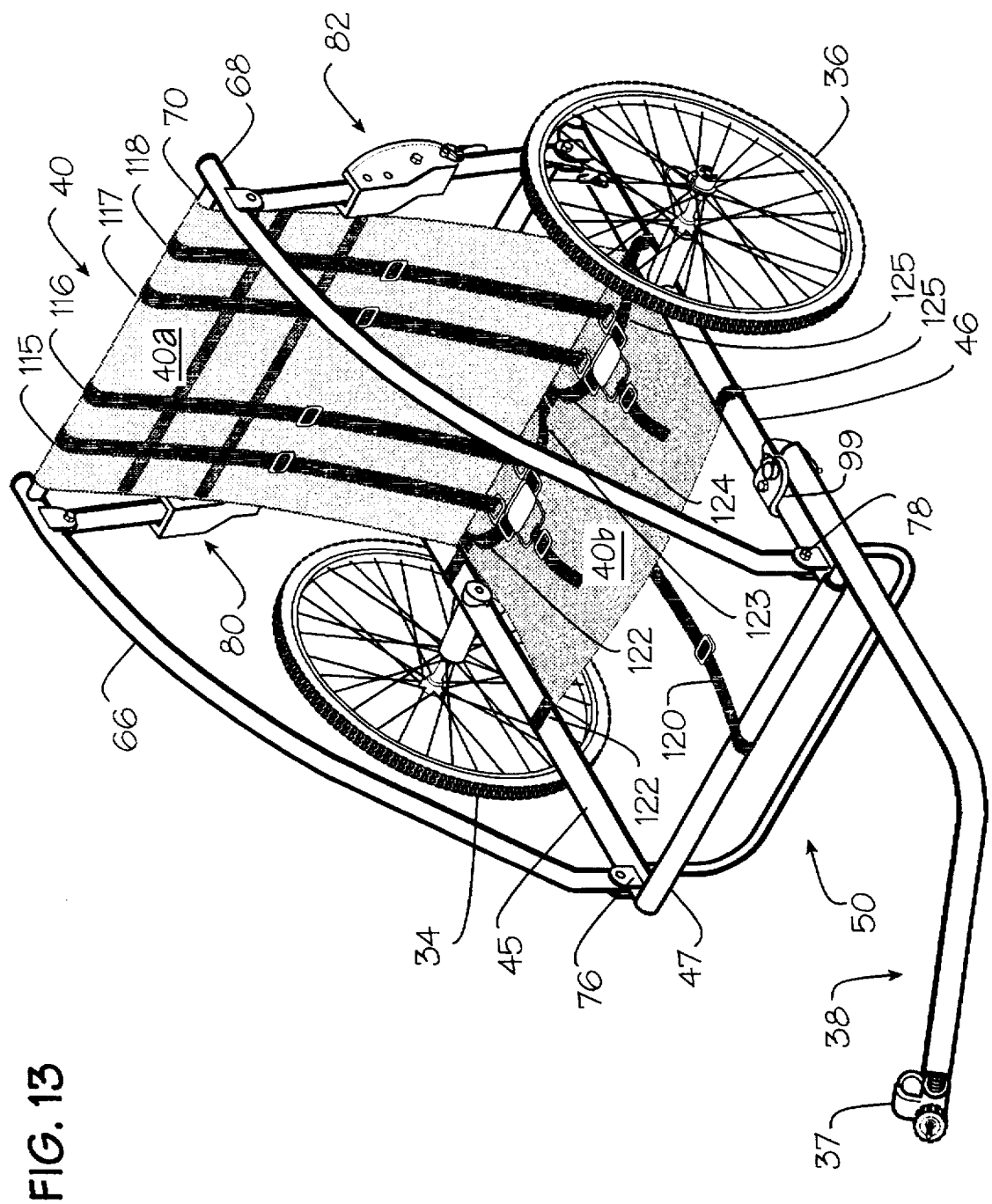
FIG. 13 is a perspective view of the tubular framing structure of the collapsible toddler trailer of FIG. 1 with the flexible cloth-like seat portion attached thereto.

Referring now to FIGS. 13 through 20, the construction and attachment of the waterproof enclosure will now be described. As shown in FIGS. 2 and 13, a flexible cloth-like seat 40 is formed of a generally rectangular length of fabric having a width slightly less than the dimension between side rails 45 and 46. The length of the fabric is long enough to extend from the crossbar 70 to the plane of the primary structural frame (rails 45–48) and forward a distance sufficient to provide a seating portion 40b.

Longitudinally extending straps 115 through 118 are selectively sewn or bonded to the surface of the fabric, with the ends of the straps extending beyond the upper edge of the fabric for enabling attachment to the rear surface 40a of the seat 40 when it is positioned over cross-bar 70. The attachment may be by buckle members on the reversed, or by forming the extending strap portions of a material, such as Velcro fastener strips. Laterally extending strips 122–125 are provided in pairs on opposite edges of the seating portion 40b and have a length sufficient to enable these strips to encircle the side rails 45, 46 for attachment. A center strap 120 extends from the middle of the front edge of the seating portion 40b for encircling the front rail 47, for all of these strips or straps, a buckle is preferably utilized, although Velcro fasteners may be used.

Figure 14:
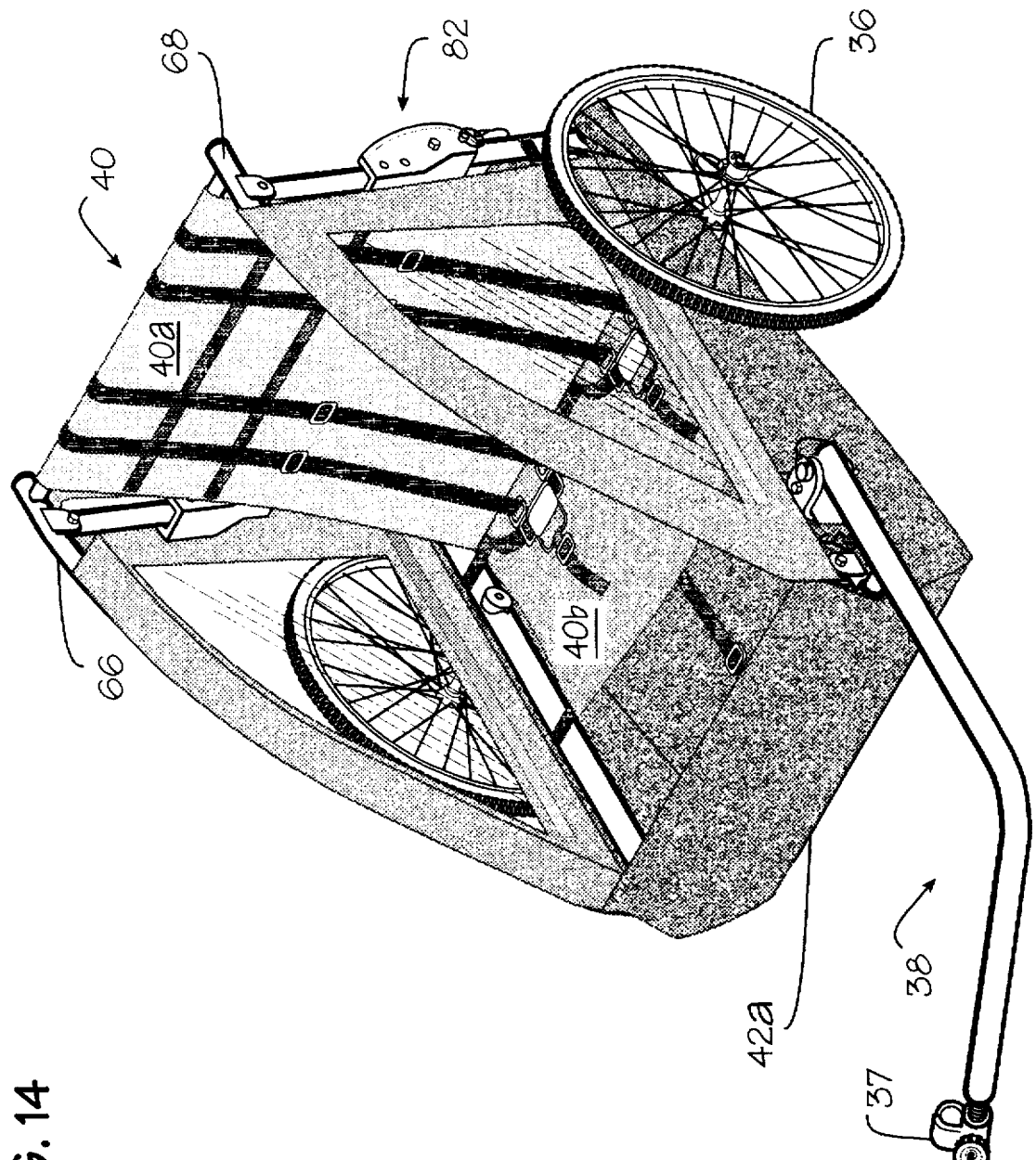
FIG. 14 is a perspective view of the tubular framing structure of the collapsible toddler trailer of FIG. 1 with the flexible cloth-like seat portion and the foot well and side curtains attached thereto.
Figure 15:
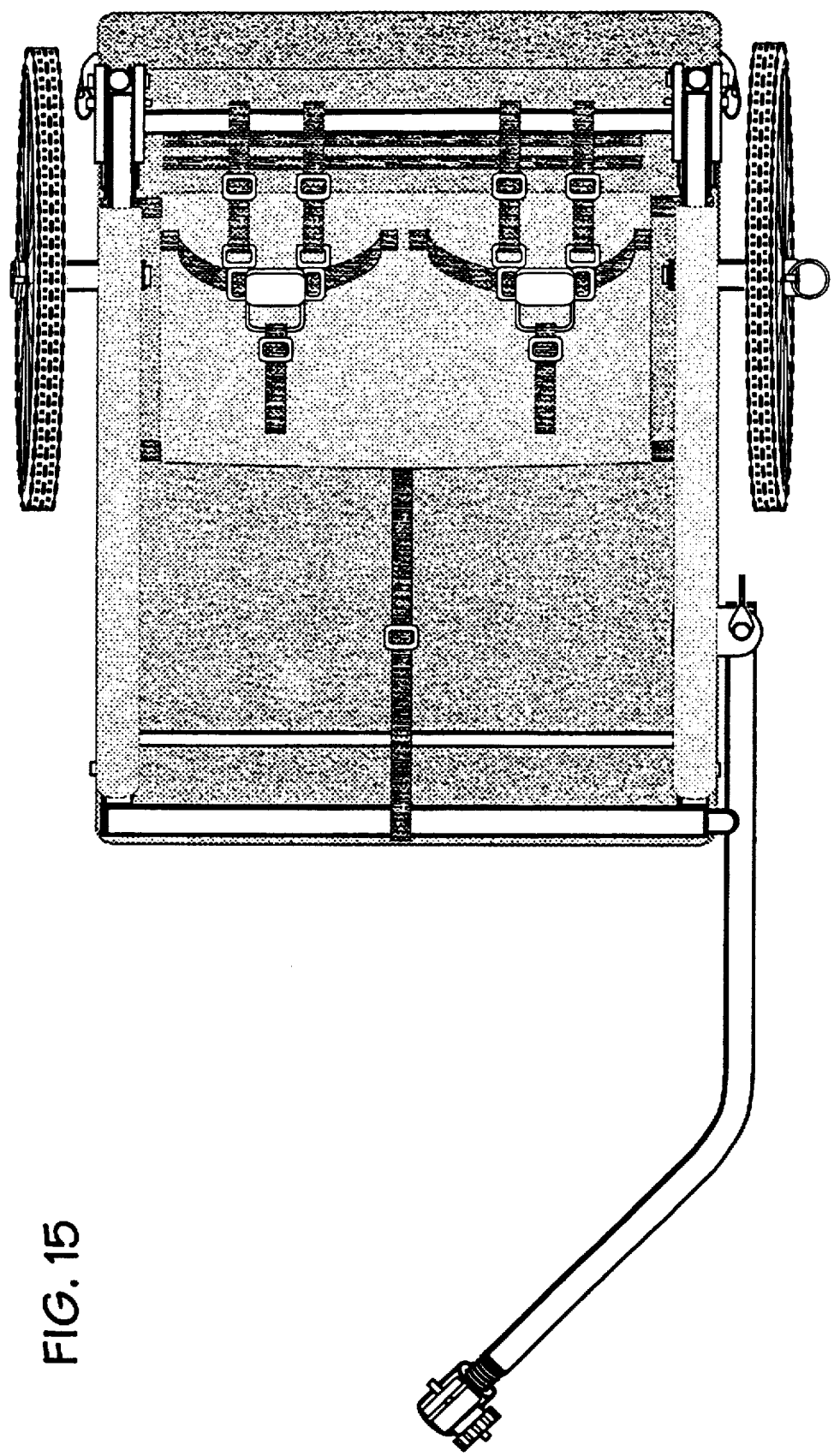
FIG. 15 is a top plan view of the collapsible toddler trailer of FIG. 14.
Figure 16:
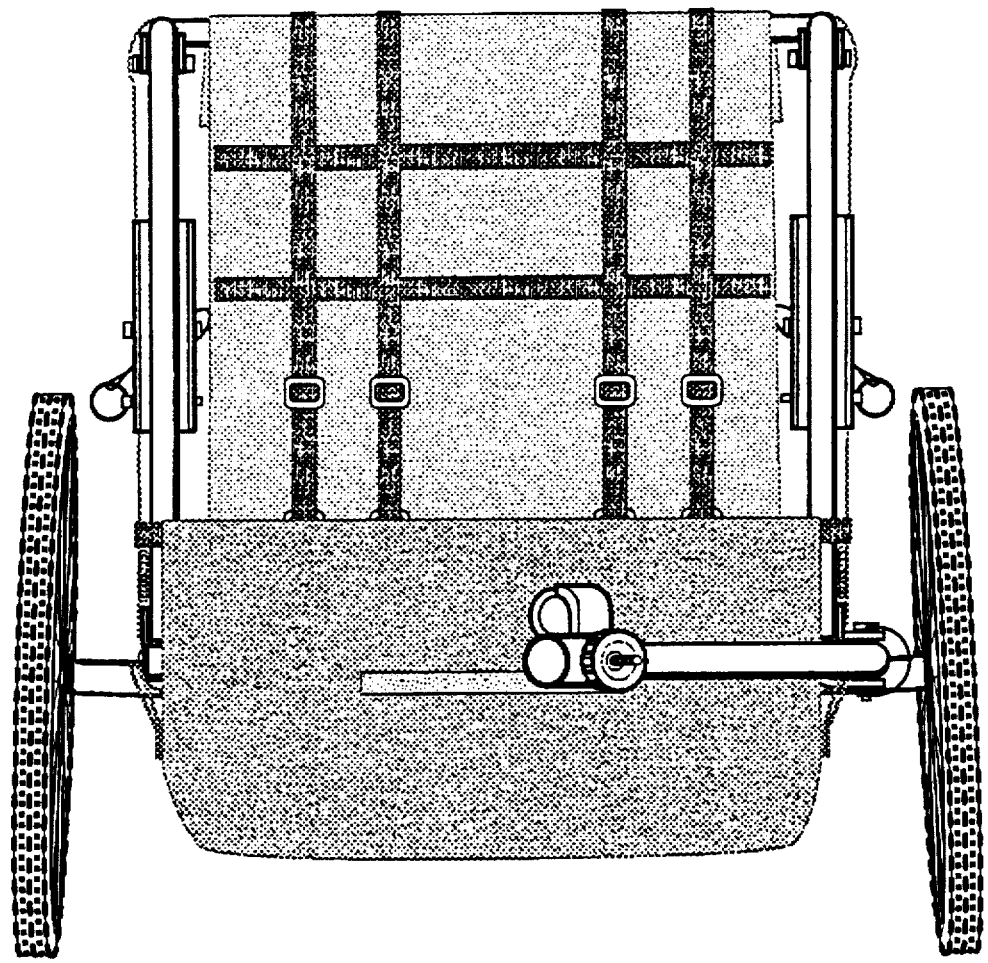
FIG. 16 is a front view of the collapsible toddler trailer of FIG. 14.
Figure 17:
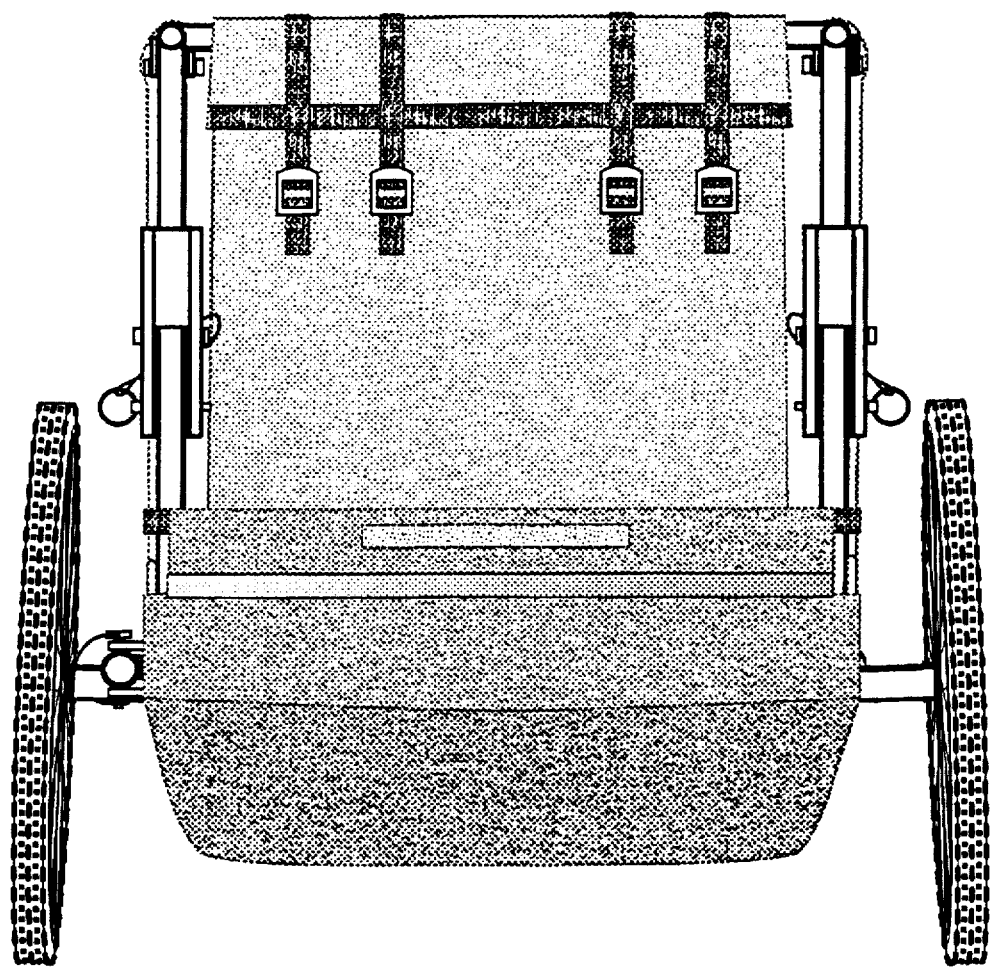
FIG. 17 is a rear view of the collapsible toddler trailer of FIG. 14.

FIGS. 2 and 14 depict the attachment of the foot well and side curtain assembly, generally designated 42. The assembly 42 includes the generally trough-shaped foot well portion 42a and the side curtain panels 42b and 42c. The panel 42b and 42c are generally triangular with the hypotenuse accurately configured to match the contour of the arcuate side rails 66 and 68. The panels have a border area and an inner transparent portion, formed of a flexible clear (or tinted) plastic material. The foot well portion 42a is formed of flexible canvas like or vinyl material and extends around the under part of the frame and ground brace 50 upwards along the sides to a line just above the side rails 45, 46, for securing the assembly 42, the front and rear edges of the foot well portion 42a and the hypotenuse edges of the panels 42b, 42c, are provided with excess strips of material for encircling the front rail 47, the rear rail 48 and the arcuate side tubes 66, 68, respectively, with these excess strips of material being provides with Velcro fasteners on the inner surfaces thereof for securing the same.

The canopy, generally designated 44, is formed of a generally rectangular piece of fabric of a width greater than the dimension between arcuate tubes 66, 68, and a length sufficient to reach from the front edge of foot well portion 42a to the rear cross rail 48 over the upper cross-bar 70. The side edges of the canopy 44 have excess material along the edges to enable them to wrap over the upper edges of the panels 42b, 42c. Suitable fastening means are provided at the corners of the canopy, such as ties 130. For ventilation, the canopy 44 has a front vent generally designated as 132, which is generally rectangular and provided with a mesh covering and a roll up generally transparent plastic window 134.

Figure 18:
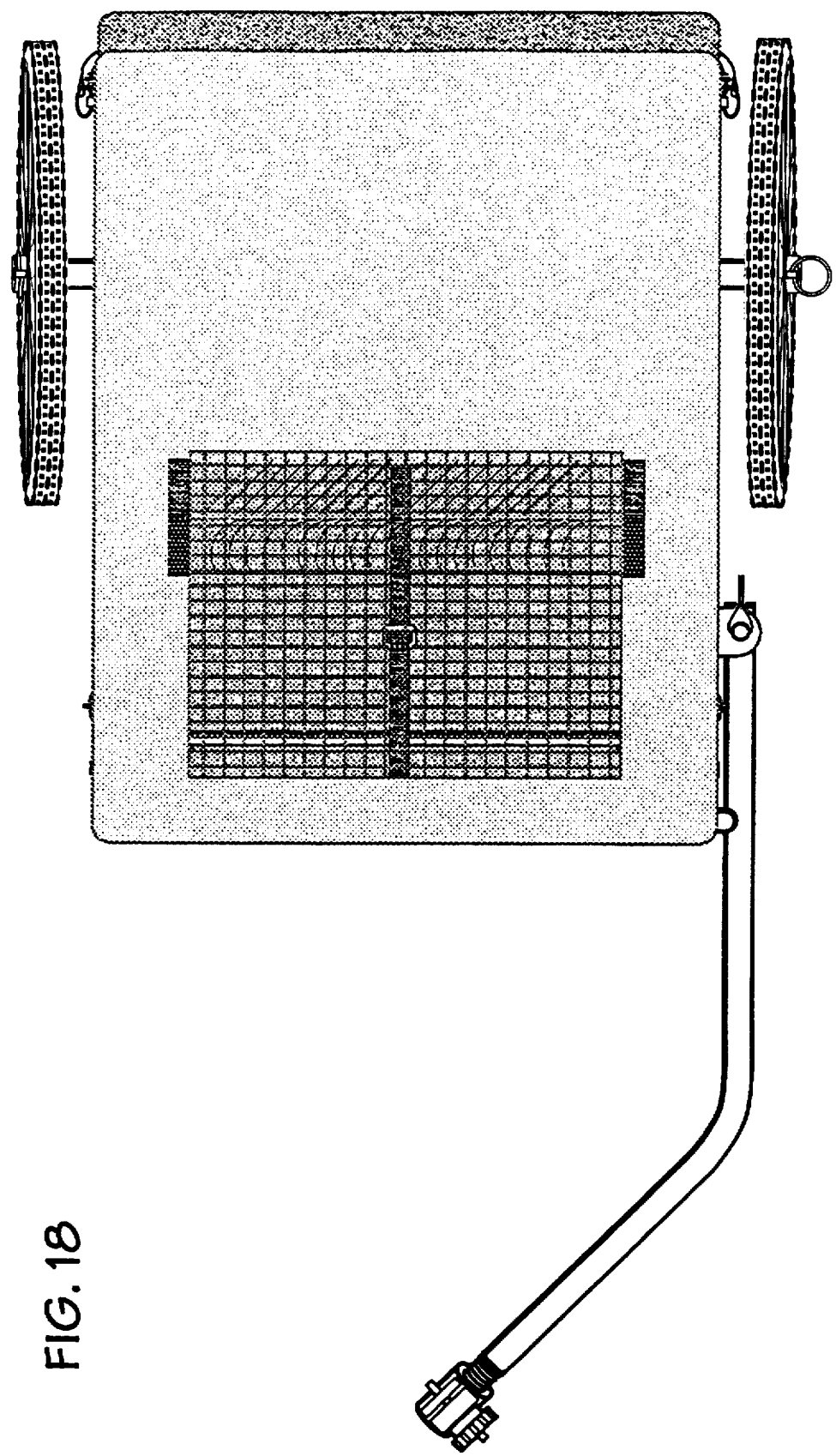
FIG. 18 is a front view of the tubular framing structure of the collapsible toddler trailer of FIG. 1 fully assembled with the flexible cloth-like seat portion and the foot well and side curtains and the canopy attached thereto.
Figure 19:
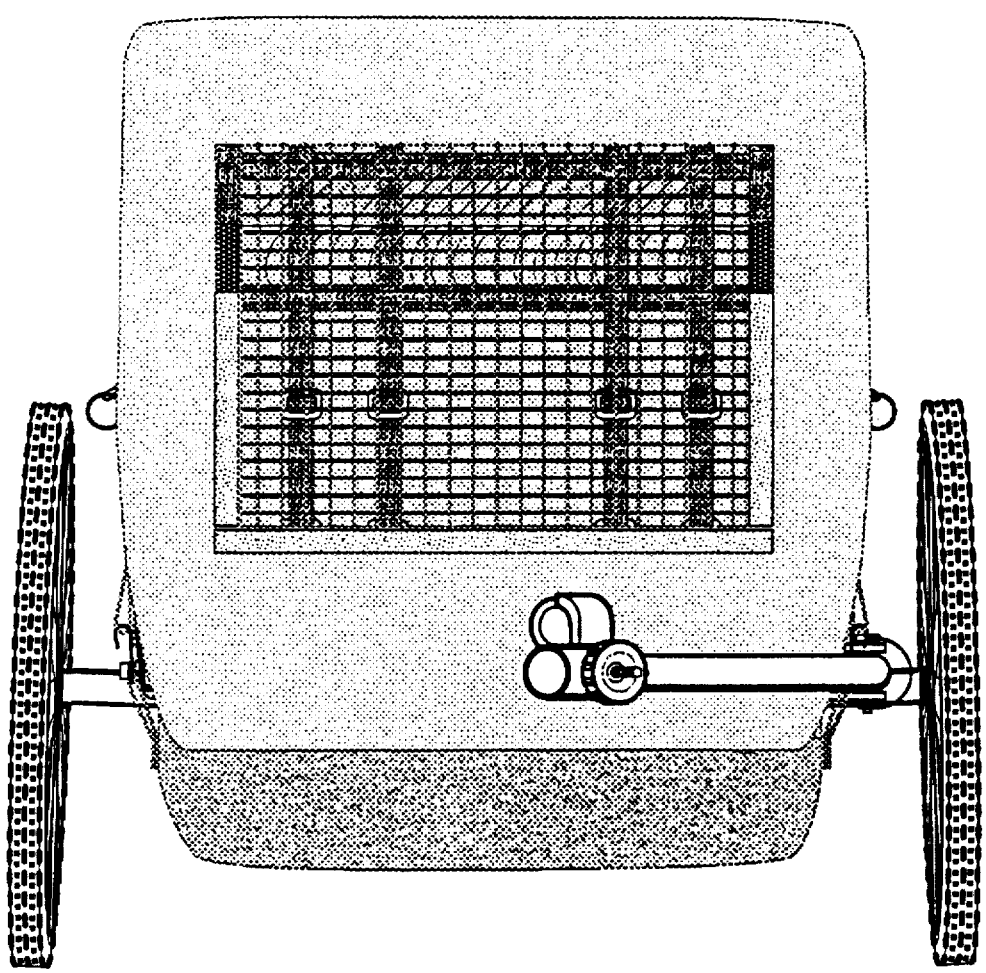
FIG. 19 is a front view of the fully assembled collapsible trailer of FIG. 18.
Figure 20:
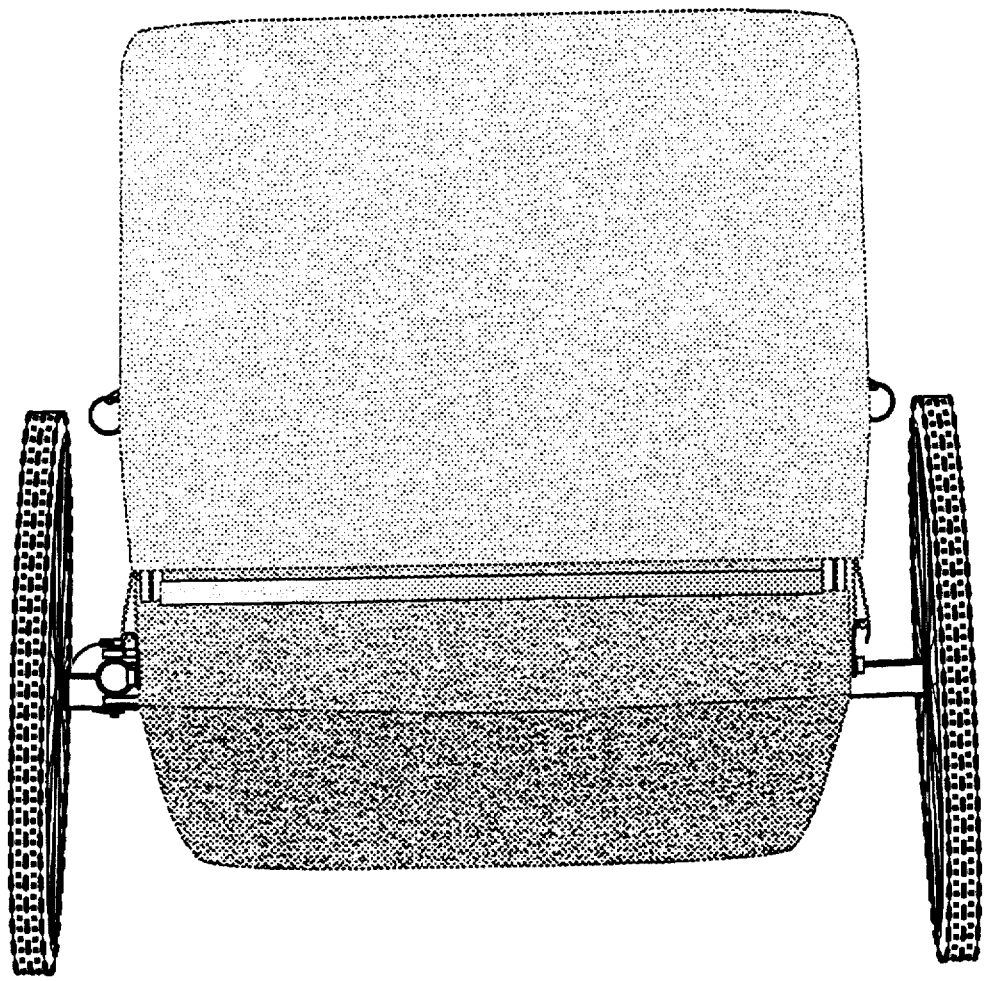
FIG. 20 is a rear view of the fully assembled collapsible toddler trailer of FIG. 18.

The trailer and fabric enclosure is fully illustrated in several views in FIG. 18 through 20 and provides ready occupancy for one or two infant travelers. The construction of the trailer is of aluminum tubing which are primarily one of two diameters, thus effecting economies of assembly. Furthermore, with the exception of the tow arm 38 and the arcuate side tubes 66, 68, all of the other tubular stock consists of straight lengths of material. Interconnectors 80, 82 are formed of bent or formed sheet aluminum of wall thickness sufficient to provide the required stability at the points of connection. In addition, interconnectors 80, 82, are dimensioned and configured for providing support in the lengthwise directions of the tubes during operation of the trailer, with the spacing between opposing walls closely approximating the diameter of the tube sections therein for lateral as well as lengthwise stability.

The trailer 30 is stable and efficient in use, with the large diameter canted rear wheels 34, 36 providing lateral stability during movement. The seating area 40b is positioned relative to the frame such that the center of gravity of an infant seated therein lies virtually directly over, or in general vertical alignment with, the axis of the rear wheels 34, 36, and approximately in the plane of the rigid primary structural frame formed of side rails 45, 46, front bar 47 and rear bar 48.

While the description has utilized directional references, such as up, down, right, left, clockwise, etc., is it to be understood that these terms are utilized with reference to the orientations in the figures and are not intended to be limiting. While there has been shown and described a preferred embodiment, other adaptations and modifications may be made without departing from the spirit and scope of the invention.

What is claimed is:

1. A trailer for towing behind a bicycle with a toddler therein, said trailer comprising:

a pair of demountable wheels;

a collapsible frame assembly, including;
   a) a structural frame assembly formed of a pair of generally parallel side rails, a front rail and a rear rail;
   b) first and second stub members secured to the outside of said side rails in generally aligned relation for supporting said demountable wheels with the axles thereof canted so that the wheels are downwardly divergent relative to a supporting surface;
   c) a generally U-shaped support having a pair of generally parallel arms and an interconnecting bight portion, said support having the distal ends of said arms thereof hingedly coupled to said frame assembly in proximate relation to said front rail;
   d) a pair of articulated tube assemblies, each having first ends thereof hingedly connected to opposite sides of said bight portion and second ends connected in proximate relation to the rear of said side rails for enabling retention of said support in a first position contiguous to said structural frame assembly and a second position with said bight portion spaced from said structural frame assembly, each of said articulated tube assemblies including a pair of tubes and an interconnector which is elongate and saddle shaped for fixedly interconnecting said tubes within said saddle shaped interconnector with said assembly in said second position, said interconnector having one of the tubes fixedly coupled within the saddle thereof, with the other of the tubes being pivotally coupled to the interconnector adjacent an end within the saddle;

a tow arm;

means on said tow arm and on said frame assembly for releasable attachment of said tow arm to said frame assembly.

2. The trailer of claim 1 further including flexible seat means attached to at least said structural frame assembly for occupant support.

3. The trailer of claim 2 further including flexible cover means for surrounding said structural frame assembly and said U-shaped support for forming a generally weatherproof enclosure for an infant or toddler.

4. The trailer of claim 3 wherein said flexible cover means includes side curtain panels for engaging the sides of said U-shaped support for providing weather protection from the sides.

5. The trailer of claim 3 wherein said flexible cover means further includes a canopy configured for engagement with said U-shaped support and said structural frame assembly for providing weather protection from the top and rear.

6. The trailer of claim 2 further including brace means in depending relation to said front rail of said structural frame assembly and wherein said flexible seat means includes a foot well portion configured for passing beneath said brace means and around the underside of said structural frame for providing weather protection for the underside.

7. The trailer of claim 1 wherein said structural frame assembly is formed of aluminum tubing material.

8. The trailer of claim 1 further including brace means in depending relation to said front rail of said structural frame assembly and said wheels are demountable.

9. The trailer of claim 1 wherein said wheels are rotatably supported on axles and each said axles is provided at the distal end thereof with an aperture for receiving a pin through said rear axle for releasably retaining said wheel on said axle.

10. The trailer of claim 1 wherein said means on said tow arm and on said frame assembly for releasable attachment includes a stub member projecting from said tow arm for insertion into an open end of said front rail.

* * * * *